US010006477B2

(12) United States Patent
Pantelides et al.

(10) Patent No.: US 10,006,477 B2
(45) Date of Patent: Jun. 26, 2018

(54) SHEET AND ROD ATTACHMENT APPARATUS AND SYSTEM

(75) Inventors: Chris P. Pantelides, Salt Lake City, UT (US); Lawrence D. Reaveley, Draper, UT (US); Clayton A. Burningham, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 1369 days.

(21) Appl. No.: 13/635,608

(22) PCT Filed: Apr. 12, 2011

(86) PCT No.: PCT/US2011/032152
§ 371 (c)(1),
(2), (4) Date: Mar. 4, 2013

(87) PCT Pub. No.: WO2011/130298
PCT Pub. Date: Oct. 20, 2011

(65) Prior Publication Data
US 2013/0195541 A1    Aug. 1, 2013

Related U.S. Application Data

(60) Provisional application No. 61/323,797, filed on Apr. 13, 2010.

(51) Int. Cl.
*F16B 9/02* (2006.01)
*E04C 5/07* (2006.01)
*B29C 65/00* (2006.01)
*E04C 5/16* (2006.01)
*E04G 23/02* (2006.01)

(52) U.S. Cl.
CPC ............... *F16B 9/02* (2013.01); *E04C 5/07* (2013.01); *B29C 66/5326* (2013.01);
(Continued)

(58) Field of Classification Search
CPC ... F16B 9/02; E04C 5/07; E04C 5/163; Y10T 403/3906; E04G 2023/0251; B29C 66/5326; B29C 66/721
See application file for complete search history.

(56) References Cited

U.S. PATENT DOCUMENTS 2,655,874 A    10/1953  Swann
3,006,114 A    8/1959   Bror
(Continued)

FOREIGN PATENT DOCUMENTS

DE    202012002354    8/2012
JP    02240308        9/1990
(Continued)

OTHER PUBLICATIONS

U.S. Appl. No. 12/896,335, Nov. 6, 2014, Notice of Allowance.
(Continued)

*Primary Examiner* — Victor L MacArthur
(74) *Attorney, Agent, or Firm* — Workman Nydegger

(57) ABSTRACT

Exemplary sheet and rod attachment apparatus and systems are described for providing composite reinforcement for one or more structures, such that one or more structures can be supported by different reinforcement mechanisms. The sheet and rod attachment apparatus includes an adaptor that couples the sheet to the rod in a manner that minimizes or substantially eliminates localized stress concentrations. The adaptor may include one or more wedge-shaped bodies contoured and configured to attach to at least a portion of a rod of a predetermined size and/or shape. A wedge-shaped body may include an interior surface for engaging the rod, and exterior surfaces extending radially from the interior surface. Example exterior surfaces are configured to engage a reinforcement sheet that extends axially from the rod.

18 Claims, 8 Drawing Sheets

(52) U.S. Cl.
CPC ............ *B29C 66/721* (2013.01); *E04C 5/163* (2013.01); *E04G 2023/0251* (2013.01); *Y10T 403/3906* (2015.01)

(56) References Cited

U.S. PATENT DOCUMENTS

| | | | |
|---|---|---|---|
| 3,091,897 A | 6/1963 | Hillberg | |
| 3,184,219 A | 5/1965 | Simms | |
| 3,230,678 A | 1/1966 | Eriksson | |
| 3,249,374 A | 5/1966 | Muehe | |
| D207,871 S | 6/1967 | Laurini | |
| 3,387,417 A | 6/1968 | Howlett | |
| 3,476,625 A * | 11/1969 | Slivinsky | B29C 37/005 |
| | | | 156/187 |
| 3,514,140 A | 5/1970 | Ely | |
| 3,568,274 A | 3/1971 | Hidden | |
| 3,595,579 A | 7/1971 | Benoit | |
| 3,632,724 A | 1/1972 | Hilgeman | |
| 3,647,184 A | 3/1972 | Vanderhurst | |
| 3,655,874 A | 4/1972 | Swann | |
| 3,659,321 A | 5/1972 | Laurent | |
| 3,703,748 A | 11/1972 | Kelly | |
| RE27,954 E | 4/1974 | Kelly | |
| 3,801,052 A | 4/1974 | Quercetti | |
| 3,877,113 A | 4/1975 | Reyes | |
| 4,006,523 A | 2/1977 | Mauquoy | |
| 4,044,987 A | 8/1977 | Tausanovitch et al. | |
| 4,140,428 A | 2/1979 | McLain | |
| 4,305,822 A * | 12/1981 | Eimer | B01D 35/22 |
| | | | 210/405 |
| 4,362,421 A | 12/1982 | Kelly | |
| 4,428,697 A | 1/1984 | Ruland | |
| 4,469,465 A | 9/1984 | Andrus | |
| 4,574,545 A | 3/1986 | Reigstad | |
| 4,604,003 A | 8/1986 | Francoeur | |
| 4,801,764 A | 1/1989 | Ohlhaber | |
| 5,016,338 A | 5/1991 | Rowan | |
| 5,096,327 A | 3/1992 | Ruland | |
| 5,251,421 A | 10/1993 | Friedrich | |
| 5,289,626 A | 3/1994 | Mochida | |
| 5,342,568 A | 8/1994 | Yokota | |
| 5,467,569 A | 11/1995 | Chiodo | |
| 5,479,748 A | 1/1996 | Siller | |
| 5,509,759 A | 4/1996 | Keesling | |
| 5,560,162 A | 10/1996 | Kemeny | |
| 5,671,572 A | 9/1997 | Siller-Franco | |
| 5,782,043 A | 7/1998 | Duncan | |
| 5,813,181 A | 9/1998 | Ashton | |
| 5,939,003 A | 8/1999 | Crigler | |
| 5,983,588 A | 11/1999 | Haddock | |
| 6,082,063 A | 7/2000 | Shrive et al. | |
| 6,164,033 A | 12/2000 | Haddock | |
| 6,561,723 B2 | 5/2003 | McCurdy | |
| 6,561,780 B2 | 5/2003 | Ollendick | |
| 6,688,047 B1 | 2/2004 | McNichol | |
| 6,848,381 B2 | 2/2005 | Thomas | |
| 7,234,280 B2 | 6/2007 | Nieto | |
| 7,237,366 B2 | 7/2007 | Donahey | |
| 7,296,385 B2 | 11/2007 | Andra | |
| 7,441,380 B2 | 10/2008 | Andra | |
| 7,441,743 B2 | 10/2008 | Behlinger | |
| 7,658,041 B2 | 2/2010 | Andra | |
| 7,677,522 B2 | 3/2010 | Bakos | |
| 7,748,972 B2 | 7/2010 | Pellicer | |
| 7,938,379 B2 | 5/2011 | Baten | |
| 8,069,624 B1 | 12/2011 | Sorkin | |
| 8,240,096 B2 | 8/2012 | Kim | |
| 8,366,340 B2 | 2/2013 | Munakata | |
| 8,413,396 B2 | 4/2013 | Oliva | |
| 8,650,819 B2 | 2/2014 | Yegge | |
| 8,702,066 B2 | 4/2014 | Steidinger | |
| 8,756,885 B1 | 6/2014 | Mathews et al. | |
| 8,800,232 B1 | 8/2014 | Keenan | |
| 8,806,836 B2 | 8/2014 | James et al. | |
| 2002/0086261 A1 | 7/2002 | McCurdy | |
| 2002/0088196 A1 | 7/2002 | Haddock | |
| 2002/0108335 A1 | 8/2002 | Haddock | |
| 2002/0157333 A1 | 10/2002 | Kadotani | |
| 2004/0055233 A1 | 3/2004 | Showalter | |
| 2004/0060256 A1 | 4/2004 | Frascari | |
| 2004/0065030 A1 | 4/2004 | Zambelli | |
| 2004/0134151 A1 | 7/2004 | Haddock | |
| 2004/0139670 A1 | 7/2004 | Nieto | |
| 2004/0200186 A1 | 10/2004 | Haddock | |
| 2004/0216403 A1 | 11/2004 | Andra | |
| 2004/0237431 A1 | 12/2004 | Park | |
| 2004/0255530 A1 | 12/2004 | Donahey | |
| 2005/0050832 A1 | 3/2005 | Comerford | |
| 2005/0102958 A1 | 5/2005 | Anderson | |
| 2005/0252116 A1 | 11/2005 | Maier | |
| 2006/0272246 A1 | 12/2006 | Andra | |
| 2007/0101672 A1 | 5/2007 | Gunther | |
| 2007/0175128 A1 | 8/2007 | McCallion | |
| 2008/0236898 A1 | 10/2008 | Walker | |
| 2008/0287212 A1 * | 11/2008 | Jung | A63B 53/10 |
| | | | 473/319 |
| 2008/0302035 A1 | 12/2008 | Shin | |
| 2008/0302928 A1 | 12/2008 | Haddock | |
| 2009/0205273 A1 | 8/2009 | Hayes et al. | |
| 2010/0037545 A1 | 2/2010 | Kekanovic | |
| 2010/0171016 A1 | 7/2010 | Haddock | |
| 2010/0229496 A1 | 9/2010 | Munakata | |
| 2010/0269430 A1 | 10/2010 | Haddock | |
| 2011/0000166 A1 | 1/2011 | Jarvis | |
| 2011/0000606 A1 | 1/2011 | Al-Emrani | |
| 2011/0072745 A1 | 3/2011 | Pantelides | |
| 2011/0094183 A1 | 4/2011 | Gasperi | |
| 2011/0214366 A1 | 9/2011 | Haddock | |
| 2011/0214367 A1 | 9/2011 | Haddock | |
| 2011/0214368 A1 | 9/2011 | Haddock | |
| 2011/0247292 A1 | 10/2011 | Li | |
| 2012/0090259 A1 | 4/2012 | Muirhead | |
| 2012/0090260 A1 | 4/2012 | Muirhead | |
| 2012/0227351 A1 | 9/2012 | James et al. | |
| 2012/0260599 A1 | 10/2012 | Zambelli | |
| 2012/0267490 A1 | 10/2012 | Haddock | |
| 2012/0297694 A1 | 11/2012 | Kim | |
| 2012/0304556 A1 | 12/2012 | Teller | |
| 2013/0145711 A1 | 6/2013 | Haddock | |
| 2013/0152496 A1 | 6/2013 | Sinclair | |
| 2013/0195541 A1 | 8/2013 | Pantelides et al. | |
| 2013/0232895 A1 | 9/2013 | Berset et al. | |

FOREIGN PATENT DOCUMENTS

| | | |
|---|---|---|
| JP | 04031565 | 2/1992 |
| JP | 10159018 | 6/1998 |
| JP | 02865208 | 12/1998 |
| JP | 03576338 | 7/2004 |
| KR | 100641403 | 10/2006 |
| KR | 100651503 | 11/2006 |
| WO | WO 00/61976 | 10/2000 |
| WO | WO 2009152412 | 12/2009 |
| WO | 2011130298 | 10/2011 |
| WO | WO 2012044989 | 4/2012 |

OTHER PUBLICATIONS

U.S. Appl. No. 12/996,759, May 30, 2014, Final Office Action.
U.S. Appl. No. 12/896,335, Jun. 23, 2014, Notice of Allowance.
International Search Report cited in Application No. PCT/US11/54320 dated Mar. 2, 2012
International Search Report and Written Opinion from PCT/2009/047176 dated Feb. 4, 2010.
International Search Report and Written Opinion from PCT/US11/32152 dated Jun. 20, 2011.
U.S. Appl. No. 12/996,759, Sep. 12, 2013, Office Action.
U.S. Appl. No. 12/896,335, Sep. 12, 2013, Office Action.
U.S. Appl. No. 12/996,759, Sep. 15, 2014, Notice of Allowance.

* cited by examiner

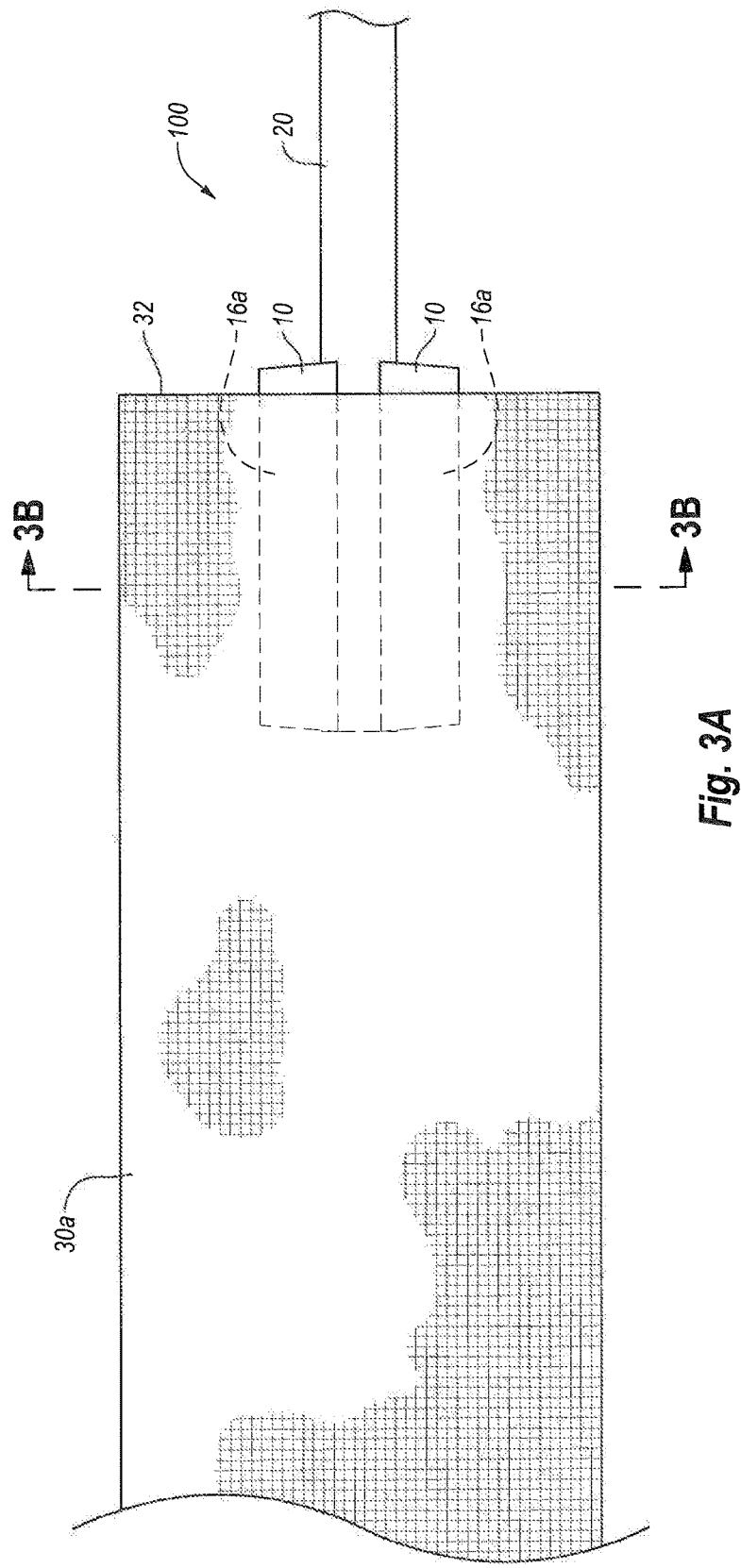

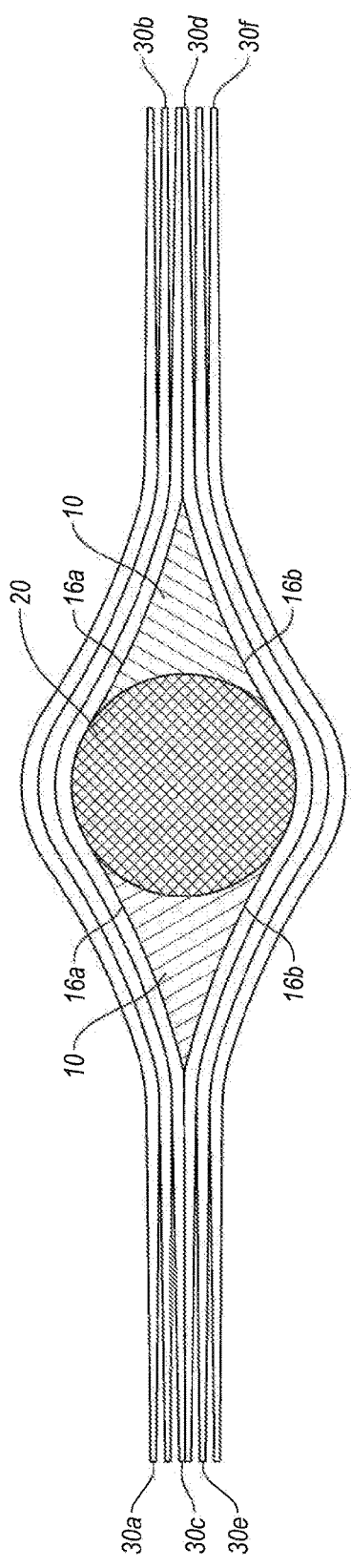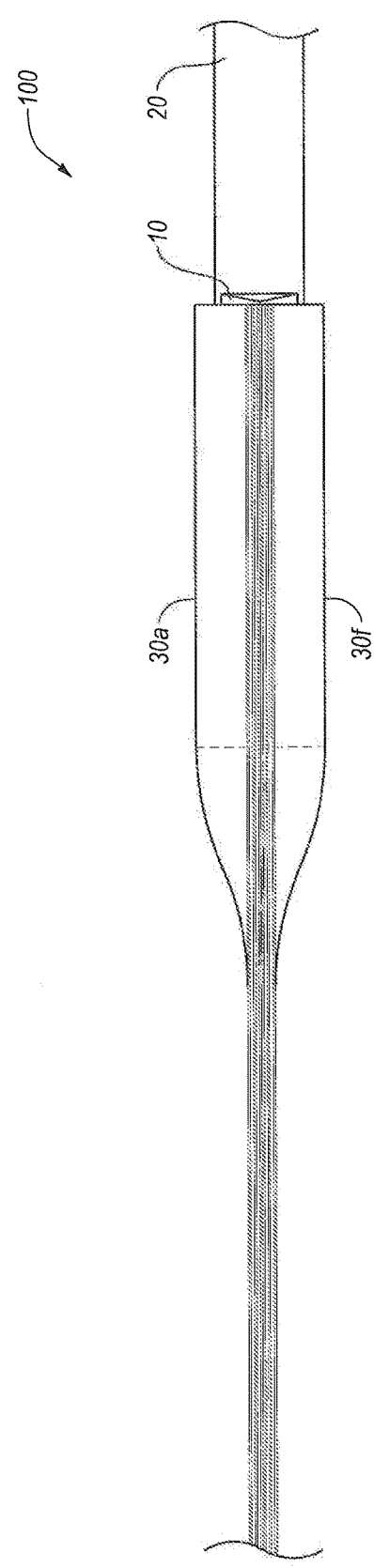
Fig. 3B
Fig. 3C

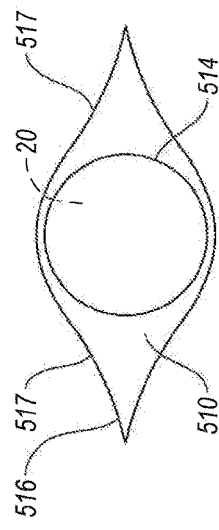
*Fig. 5C*
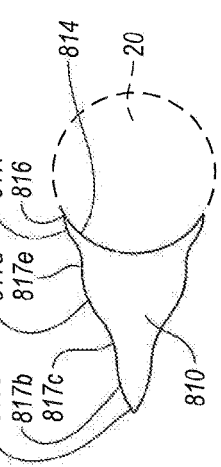
*Fig. 5F*
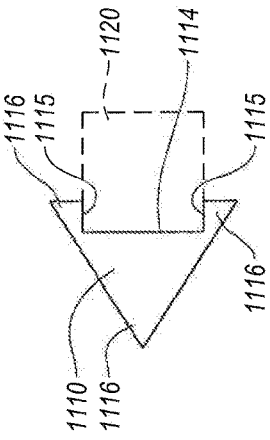
*Fig. 5I*
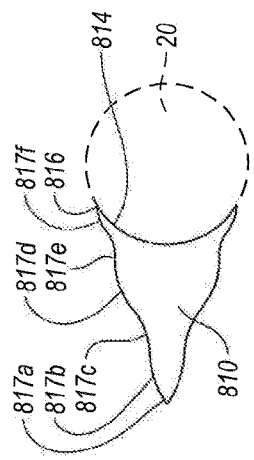
*Fig. 5B*
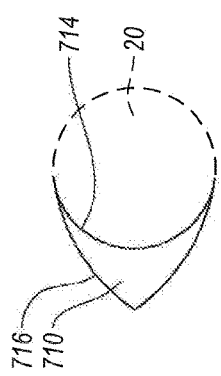
*Fig. 5E*
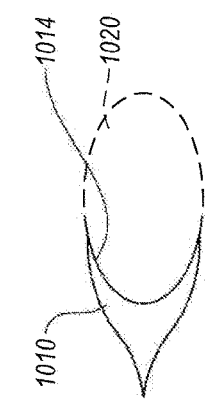
*Fig. 5H*
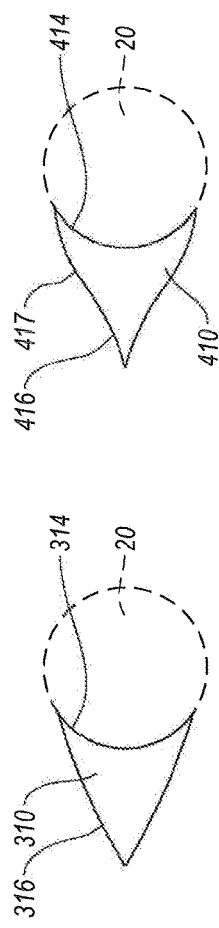
*Fig. 5A*
*Fig. 5D*
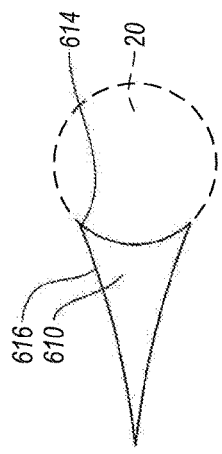
*Fig. 5G*

SHEET AND ROD ATTACHMENT APPARATUS AND SYSTEM

CROSS-REFERENCE TO RELATED APPLICATIONS

This application claims priority to, and the benefit of, PCT Application Serial No. PCT/US2011/032152, filed on Apr. 12, 2011, and entitled "SHEET AND ROD ATTACHMENT APPARATUS AND SYSTEM", which also claims priority to and the benefit of, U.S. Patent Application Ser. No. 61/323,797, filed on Apr. 13, 2010, and entitled "SHEET AND ROD ATTACHMENT APPARATUS AND SYSTEM", which applications are expressly incorporated herein by this reference in their entirety.

GOVERNMENT RIGHTS

This invention was made with government support under Contract #089113 awarded by the State of Utah Department of Transportation. The Government has certain rights to this invention.

BACKGROUND OF THE INVENTION

1. Field of the Invention

Exemplary embodiments of the invention relate to reinforcement systems. More particularly, embodiments relate to apparatus, assemblies, and systems used to provide composite reinforcement by utilizing multiple different reinforcement mechanisms. More particularly still, embodiments relate to coupling a reinforcement rod to a reinforcement sheet to provide reinforcement of one or more structures, such that both the reinforcement rod and reinforcement sheet collectively provide reinforcement with reduced stress concentrations adversely affecting structural integrity and/or performance.

2. The Relevant Technology

Fibre-reinforced polymer (FRP) composite rods and fabric have emerged as alternatives to traditional construction, rehabilitation, and repair systems of reinforced concrete columns, bridges, girders, and the like. Relative to traditional reinforcement materials such as steel, FRP provides a relatively high strength-to-weight ratio, a resistance to corrosion, and low labor cost as a result of its relative ease of use and application. Such benefits have been significant factors in the use of FRP in a large number of public and private projects, and the same benefits also create expectations that deployment of FRP will escalate, particularly in regions that are seismically active.

FRP materials are also becoming increasingly available such that they can be used in a wider range of applications. FRP rods, for example, are being used to reinforce girders and beams in bridges, buildings, and other structures. For instance, an FRP rod may be attached to an anchor that is in turn secured to the girder or beam. Alternatively, near-surface mount (NSM) techniques may be employed. To utilize NSM techniques, a groove is traditionally cut into a concrete or masonry surface. The FRP rod may then be placed within the groove and secured in place using an epoxy adhesive or cementitious grout, to effectively embed the FRP rod inside the concrete or masonry.

FRP fabrics have also more recently been used to reinforce, rehabilitate, and/or repair existing beams, columns, plates, and other structures. More particularly, FRP fabrics have been utilized in a manner that provides wholly external application of the FRP to the structure. FRP fabric may, for example, be wrapped around an external surface of a beam and bonded in place to repair structures that have undergone some seismic or other damage, or to strengthen a beam or joint, so as to prevent failure of the structure.

Relative to other reinforcement, repair, and rehabilitation materials, FRP materials still carry with them a relatively high cost. As a result, there is a desire to minimize the amount of FRP materials in use, so that the associated costs may also be reduced. Consequently, no one-size-fits-all approach is always desired, and some structures may benefit from use of FRP reinforcement rods, while FRP reinforcement fabric may provide greater benefits for other structures. In still other structures or applications, a composite approach that utilizes both FRP rods and FRP fabric may be desired.

Unfortunately, no single mechanism currently allows effective use of FRP rods and FRP fabric in a manner that structurally links the fabric to the reinforcement rods. More particularly, no adaptor has been developed to allow a transition from a rod reinforcement member to a sheet reinforcement member. Further, while possible to wrap the FRP sheet materials directly around the FRP rods, such a procedure would cause the sheet materials to bend and deform. Then, as a load is applied, the deformed sheet materials would have localized stress concentrations that reduce the structural integrity of the FRP sheet materials, thereby reducing their load carrying capabilities. Such a design may therefore be prone to premature failure, or may require additional materials to be utilized, thereby increasing the cost for the repair or rehabilitation of the structure.

Accordingly, what is desired are adaptors and attachment apparatus and systems that are usable with FRP materials, and which can couple a rod to a sheet material in a manner that reduces the localized stress concentrations, thereby also reducing the likelihood of premature failure of the sheet materials. Preferably, such adaptors, apparatus, and systems are adaptable to a wide variety of different materials and applications.

BRIEF SUMMARY OF THE INVENTION

Example embodiments of the present invention relate to adaptors, apparatus, and systems for attaching a rod to a sheet. For example, example adaptors are described herein that attach to a rod and allow a fabric material to be attached to the rod in a manner that reduces the amount of bending required to secure the fabric around the rod, thereby increasing the load-carrying capabilities of the fabric relative to fabric folded and wrapped directly around the rod. As part of the system, an adaptor is described that operates as an attachment mechanism for attaching the rod and sheet so that they can cooperate in reinforcing one or more structures. In one embodiment, the adaptor includes one or more connectors configured to couple to a rod to one or more layers of a sheet material. For instance, the connector may include a contoured interior surface that is sized and shaped to engage at least a portion of a rod of a predetermined size. A first exterior surface that extends radially from the contoured interior surface may be sized and shaped to receive a sheet material, as may a second exterior surface that also extends radially from the contoured interior surface. The first and second exterior surfaces may extend radially in the same direction, and be opposed and intersecting.

Such a connector may, for example, have a wedge-shaped body. The wedge-shaped body may also be elongated in a manner such that extends in an axial direction. Optionally, the interior surface that is configured to engage the rod may have a circumferential contour that mates with an outer surface of the rod. Such engagement may be around any portion of the rod, and may occur over an interval of about seventy-five degrees to about one-hundred eighty degrees of the external surface of the rod. The first and second exterior surfaces may be concave, convex, or planar along all or a portion thereof, or may be a combination of concave, convex, and planar.

A sheet and rod attachment system is also described in which a rod having an external surface is connected to a sheet adaptor. The sheet adaptor may include one or more connectors, and such connectors may include, for example, a rod engagement surface and first and second sheet attachment surfaces. The rod engagement surface may be configured to engage the exterior surface of the rod, and may be sized and shaped to correspond to such exterior surface. The sheet attachment surfaces may extend radially from the rod engagement surface and connect to each other.

In some embodiments, the rod may be made of FRP. Further, while in some cases the adaptor and rod may be integrally formed, in other cases the adaptor is discretely formed relative to the rod, and is thereafter affixed to the rod. The adaptor may be affixed to the rod by using an adhesive, clamp, bracket, thermal bond, or other suitable mechanism.

In some cases, the sheet adaptor includes at least two adaptors. The two adaptors may, for example, be substantially identical and offset by one-hundred eighty degrees around the rod. A flexible sheet layer may also be secured to the first attachment surface and extend axially relative to the rod. Multiple sheet layers may also be connected. For instance, one sheet layer may be attached to the first attachment surface while a second sheet layer may be attached to the second attachment surface. Multiple sheet layers may also be attached to one or both of the first and second attachment surfaces. For instance, a stack of two or more layers may be secured to the first and/or second attachment surface of a connector.

In another embodiment, a composite rod and fabric reinforcement system is described. Such a system may be a composite system because it utilizes composite materials or because different types of reinforcement members are connected together. For instance, in one embodiment, the composite system connects a rod reinforcement member to a fabric or sheet reinforcement member. The rod may reinforce a first structure and the fabric may reinforce a second structure. An adaptor may be coupled to the exterior surface of the rod and placed between the rod and fabric. The adaptor may have a wedge-shaped body that includes first and second exterior surfaces having proximal and distal edges. The proximal edges of the first and second exterior surfaces may intersect at an acute angle. A rod coupling surface may also be disposed between the distal edges of the first and second exterior surfaces. The rod coupling surface may be contoured to match the exterior surface of the elongated rod. Fabric may also be secured to the first and second exterior surfaces and extend axially relative to the elongated rod.

In a system using both a rod and fabric within a reinforcement system, both the fabric and rod may be made of FRP. In addition, or in the alternative, the adaptor may include two connectors that are substantially identical and on opposite sides of the rod. A second adaptor may also be axially offset at, for example, an opposing end of the fabric, such that it connects to a second rod.

In another embodiment, a rod-to-sheet connector body includes an exterior surface extending about a periphery of the body. At least a portion of the exterior surface is sized and shaped to receive a flexible sheet layer thereon. A plurality of rod engagement surfaces are formed in the exterior surface. Each of the rod engagement surfaces have a contour sized and shaped to engage at least a portion of a rod of a predetermined size.

These and other aspects of embodiments of the present invention will become more fully apparent from the following description and appended claims.

BRIEF DESCRIPTION OF THE DRAWINGS

Features and advantages of the invention will be apparent from the detailed description that follows, and which taken in conjunction with the accompanying drawings, together illustrate features of the invention. It is understood that these drawings merely depict exemplary embodiments of the present invention and are not, therefore, to be considered limiting of its scope. Additionally, the drawings are generally illustrative of an example scale for example embodiments; however, it should be understood that the scale may be varied and the illustrated embodiments are not necessarily drawn to scale for all embodiments encompassed herein.

Furthermore, it will be readily appreciated that the components of the present invention, as generally described and illustrated in the figures herein, could be arranged and designed in a wide variety of different configurations, and that components within some figures are interchangeable with, or may supplement, features and components illustrated in other figures. Nonetheless, the invention will be described and explained with additional specificity and detail through the use of the accompanying drawings, in which:

FIG. 3A illustrates a top view of an example rod and sheet connection system in which a sheet is connected to a rod by using an example adaptor;

FIG. 3B illustrates a frontal, cross-sectional view of the rod and sheet connection system illustrated along line AA in FIG. 3A;

FIG. 3C illustrates a side view of the rod and sheet connection system illustrated in FIGS. 3A and 3B;

FIG. 5A illustrates a frontal view of an example connector that operates as an adaptor to couple a rod to sheet materials;

FIG. 5B illustrates a frontal view of an example connector that operates as an adaptor to couple a rod to sheet materials;

FIG. 5C illustrates a frontal view of an example connector that operates as an adaptor to couple a rod to sheet materials;

FIG. 5D illustrates a frontal view of an example connector that operates as an adaptor to couple a rod to sheet materials;

FIG. 5E illustrates a frontal view of an example connector that operates as an adaptor to couple a rod to sheet materials;

FIG. 5F illustrates a frontal view of an example connector that operates as an adaptor to couple a rod to sheet materials;

FIG. 5G illustrates a frontal view of an example connector that operates as an adaptor to couple a rod to sheet materials;

FIG. 5H illustrates a frontal view of an example connector that operates as an adaptor to couple a rod to sheet materials;

FIG. 5I illustrates a frontal view of an example connector that operates as an adaptor to couple a rod to sheet materials;

DETAILED DESCRIPTION OF THE INVENTION

Figure 1A:
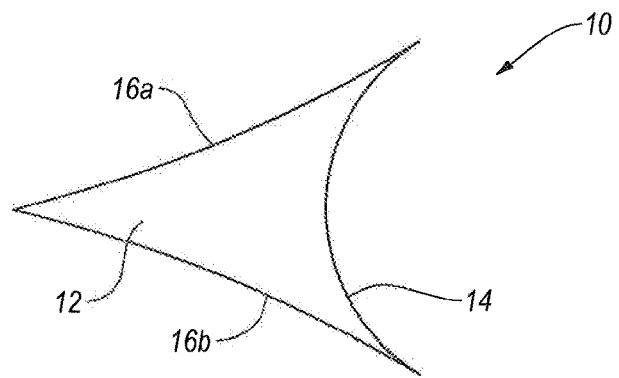
FIG. 1A illustrates a frontal view of an example connector that operates as an adaptor to couple a rod to sheet materials.

Reference will now be made to the exemplary embodiments illustrated in the figures, wherein like structures will be provided with similar reference designations. Specific language will be used herein to describe the exemplary embodiments, nevertheless it will be understood that no limitation of the scope of the invention is thereby intended. It is to be understood that the drawings are diagrammatic and schematic representations of various embodiments of the invention, and are not to be construed as limiting the present invention, unless such shape, form, scale, function or other feature is expressly described herein as essential. Alterations and further modifications of the inventive features illustrated herein, and additional applications of the principles of the inventions as illustrated herein, which would occur to one skilled in the relevant art and having possession of this disclosure, are to be considered within the scope of the invention. Furthermore, various well-known aspects of at least FRP rods, steel reinforced polymer (SRP) rods, metallurgy, and mechanical fasteners are not described herein in detail in order to avoid obscuring aspects of the example embodiments.

In describing and claiming the present invention, the term "rod" is utilized herein to generically describe a variety of different structural components. In particular, "rod" may be used to effectively refer to any elongated member, including tendons, cables, pipes, shafts, bars, beams, rods, and other like members which are extendible and usable for reinforcing structures over a span or length of a member. Such materials can include, but are not limited to FRP rods, SRP rods, and/or metallic, polymer, organic and composite bars, tendons, or cables.

Further, in describing and claiming the present invention, the term "sheet" is utilized herein to generically describe a variety of different structural components, including those used for reinforcement. In particular, "sheet" may be used to effectively refer to any sheet-like material, including fabrics, meshes, flexible plates, and other like members which have a relatively thin construction relative to a rod, and which are usable for reinforcing structures or spanning gaps between reinforced members. Such materials may include, but are not limited to FRP fabrics, SRP fabrics, and/or metallic, polymer, organic, and composite fabrics and flexible sheeting.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may also be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. Furthermore, such ranges are intended to be non-limiting examples of example embodiments, and should not be construed as required for all embodiments unless explicitly recited as such in the claims.

Further, elements, components, features, and the like may be presented herein and described as being identical, or substantially identical, relative to other corresponding elements, components, or features. Such description of identical aspects should also be interpreted flexibly to include not only elements, components, or features that are identical in all regards, but also elements, components, or features that are different in terms of expected manufacturing tolerances and deviations, and process and/or material impurities. Additionally, identical elements should also be interpreted to include other elements or components which include the same features in a mirror-image and/or rotated form. Furthermore, the description of components as being identical is intended to include non-limiting examples of example embodiments, and should not be construed as required for all embodiments unless explicitly recited as such in the claims.

Illustrated in, and described relative to, FIGS. 1A through 6 are various exemplary embodiments of attachment devices and adaptors for coupling together different types of reinforcement members. Such exemplary embodiments may be used, for example, to couple together rods and sheet materials of a wide variety of different materials, including FRP, SRP, metallic, polymeric, organic, composite, and other materials. The illustrated systems and apparatus can be used to couple different types of reinforcement members to supplement or replace steel reinforcement in static structures made from concrete and other rigid construction materials, such as masonry, steel and wood. The present invention can apply to rods and/or sheets in new construction as well as the repair/rehabilitation of existing reinforced, pre-stressed, or other concrete, steel, masonry or timber elements such as beams, columns and walls. The present invention also has application in seismic connections for new or existing materials in buildings, bridges, pipelines, and the like. It should also be noted that the phrase "static structure" is used broadly to represent any structure that could be reinforced by a rod and/or sheet, and is not limited to buildings, bridges, pipelines, etc. Indeed, a moving structure could also be a static structure as described herein. For example, a moving structure may be strengthened or supported by a sheet and rod reinforcement system attached thereto, such that there is little or no relative motion between the moving structure and the sheet and rod reinforcement system, thereby causing the structure to be effectively static in relation to the reinforcement system.

The reinforcement system of the present invention can be used to secure a rod and/or sheet to one or more static structures. The static structure can be any building, wall, column, beam, foundation, roof, pipeline, infrastructure component, or other structure, and may be made from concrete, steel, masonry, wood or other similar building materials. The rod and/or sheet may be utilized in both interior and exterior configurations. In either such configuration, the rod and/or sheet need not be connected or bonded to the static structures, but may be at least partially free to move and stretch along its length independent of the static structures themselves.

The reinforcement system can be installed horizontally, vertically or at any angle depending on the particular structural design, and may be installed in multiple directions (e.g., rod extends horizontally while an attached sheet extends orthogonally or perpendicularly therefrom). The reinforcement system could also be installed along all or a portion of the height of a vertical structure, with one end of a rod secured to the foundation and an opposing end of the rod extending vertically, from which the sheet may further extend along, around, or within an additional surface. The reinforcement system can be placed to press directly against a contact surface of the static structures, or may span gaps between surfaces and/or static structures.

Now turning to FIGS. 1A and 1B, a particular example of a sheet-to-rod connector will be described. It will be appreciated that, as with all embodiments disclosed herein, the illustrated embodiments are merely exemplary and include features and/or components that can be combined in or with different embodiments. Thus, no feature or component should be interpreted to require use with only one or more other components or features.

A frontal view of an exemplary sheet and rod connector 10 is illustrated in FIG. 1A according to some example embodiments of the present invention. In the illustrated embodiment, connector 10 may itself, or in combination with one or more other connectors, devices, or features, act as an adaptor to couple a sheet material to a rod, as described in greater detail herein. An example connector 10 may, according to some embodiment, have a generally wedge-shaped body 12. For example, in FIG. 1A, the two-dimensional figure illustrates a generally triangular configuration of body 12, although other configurations and shapes may be utilized.

Figure 1B:
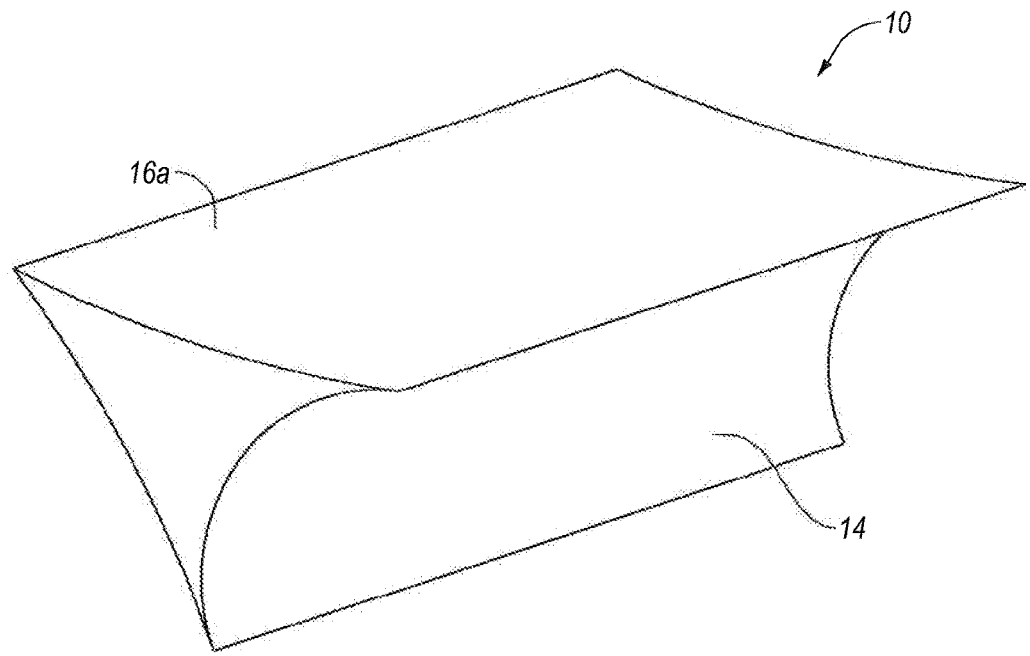
FIG. 1B illustrates a perspective view of the example connector illustrated in FIG. 1A.

More particularly, body 12 of the illustrated embodiment includes a variety of edges that, as shown in FIG. 1B, may extend in an axial direction to form a surface. For example, body 12 may include an interior surface 14 and a plurality of exterior surfaces 16a, 16b. As described herein, each of surfaces 14, 16a, 16b may have a different purpose and/or use in connecting a rod material to a sheet material.

For instance, according to one embodiment, interior surface 14 is configured to act as a rod attachment surface. In the illustrated embodiment, for instance, interior surface 14 is concave and curves inward towards the interior of body 12. Any suitable contour may be used. For instance, in the illustrated embodiment, concave interior surface 14 may have a rounded configuration that generally corresponds to a circular, circumferential outer surface of a rod. Such outer surface of the rod may be of a predetermined size, such that body 12 is configured to engage and fit against a rod of a fixed, predetermined size. Such size may be based on a diameter of the rod, on an arc length, or some other measurement of the rod.

Moreover, interior surface 14 may be contoured to extend over any desired length of a corresponding rod. For instance, the illustrated embodiment may extend along an arc length that corresponds to approximately one-hundred twenty degrees of a corresponding circular rod. In other embodiments, however, interior surface 14 may extend along a larger or smaller portion of the rod. For example, interior surface 14 may extend along an arc length corresponding to any angle between seventy-five and one-hundred eighty degrees of the rod, although such intervals are also merely exemplary, and the angle may be less than seventy-give degrees or more than one-hundred eighty degrees. Indeed, in some embodiments, the contoured interior surface may extend around a full three-hundred sixty degrees of the rod perimeter.

As further illustrated in FIGS. 1A and 1B, interior surface 14 is generally disposed between two exterior surfaces 16a, 16b. In this example embodiment, exterior surfaces 16a, 16b are substantially identical and are mirror images. Specifically, first exterior surface 16a is illustrated as an upper surface and extends from an upper location of interior surface 14, and generally slopes downward. Contrastingly, second exterior surface 16b is illustrated as a lower surface and extends from a lower location of interior surface 14, and generally slopes upward. First and second exterior surfaces 16a, 16b, may thus slope towards each other, and can intersect at a point as shown in FIG. 1A, to provide a generally triangular form to body 12.

While a function of interior surface 14 may generally include mating with a corresponding profile of a rod that is secured to body 12 along interior surface 14, first and second exterior surfaces 16a, 16b may include alternative functions. For instance, as best illustrated in FIG. 1B, exterior surfaces 16a, 16b may themselves be generally quadratic (e.g., rectangular, trapezoidal, parallelogram, etc.). In one embodiment, such exterior surfaces 16a, 16b act as sheet attachment surfaces. More particularly, sheet reinforcement or other materials may be placed on exterior surfaces 16a, 16b and secured thereto. Such sheet materials may extend axially along the rod, and extend partially or fully along the length of exterior surfaces 16a, 16b.

The length of exterior surfaces 16a, 16b may be varied based on the application. For example, in some embodiments, body 12 may be secured to a rod by using an epoxy or other adhesive placed on interior surface 14. The effectiveness of connector 10 may be based on the stresses occurring between the rod and interior surface 14, such that the length of body 12 is dictated by the connection to the rod. For instance, a particular length may be desirable such that when a tensile force is applied to the rod, body 12 doesn't separate from the rod.

In other embodiments, the effectiveness of connector 10 may instead be based on the stresses occurring between the sheet material and exterior surfaces 16a, 16b. For instance, the sheet materials may be connected to body 12 at or along exterior surfaces 16a, 16b. The desired length of body 12 may be largely dictated by the connection to the sheet, such that a particular length may be desirable such that when a tensile force is applied to the sheet material, body 12 does not separate from the sheet material.

Further, connector 10 may be used in a wide variety of different conditions. For example, depending on the types of forces applied, the strengths of the forces, the type of adhesive or other connections between connector 10 and a rod and sheet material, weather conditions, and the like, different lengths of body 12 may be desired. In short, connector 10 may thus have any suitable length. For instance, in one embodiment, connector 10 is elongated and its length substantially exceeds the width and height of the triangular form of body 12 illustrated in FIG. 1A. By way of example only, connector 10 may have a length that is between about two and about five times the width and/or height of body 12, although in other embodiments the length may be lesser or greater. Indeed, in some embodiments, the length of connector 10 may be less than the width and/or height of body 12.

It will also be appreciated in view of the disclosure herein that connector 10 may be made of any number of different materials and have any of a variety of different features. For example, in one embodiment, connector 10 may be formed from steel or another metallic material or alloy. In other embodiments, connector 10 may be formed from an epoxy or other polymeric material. Still other materials may also be used, including FRP, SRP or other composite materials, organic materials, or any other suitable material.

Furthermore, the particular shape and configuration of connector 10 may be varied. In FIGS. 1A and 1B, for example, exterior surfaces 16a, 16b are slightly curved. For instance, exterior surfaces 16a, 16b are concave and curve inward towards the interior of body 12. In one embodiment, such curvature may increase the surface area of exterior surfaces 16a, 16b, thereby creating a larger surface over which a bond may be made with an attached sheet material. Similar effects may be obtained by providing a convex surface. In other embodiments, however, exterior surfaces 16a, 16b may be straight, such that they have a generally two-dimensional, planar form.

In still other embodiments, one or more surface treatments may be applied to exterior surfaces 16a, 16b and/or interior surface 14. Such surface treatments may, for example, facilitate connections between connector 10 and a rod and/or sheet material. For instance, a rough, gritty, or dimpled surface treatment may create pockets and increase the surface area for attachment of an adhesive, thereby providing an increased strength to the connection between connector 10 and the rod and/or sheet material.

Figure 2A:
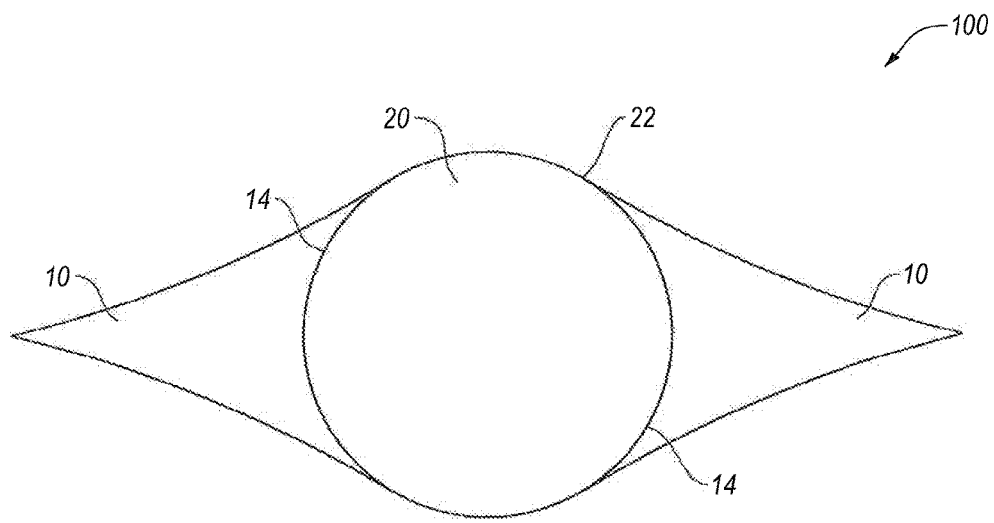
FIG. 2A illustrates a frontal view of a rod having an adaptor that includes a set of two example connectors coupled thereto.
Figure 2B:
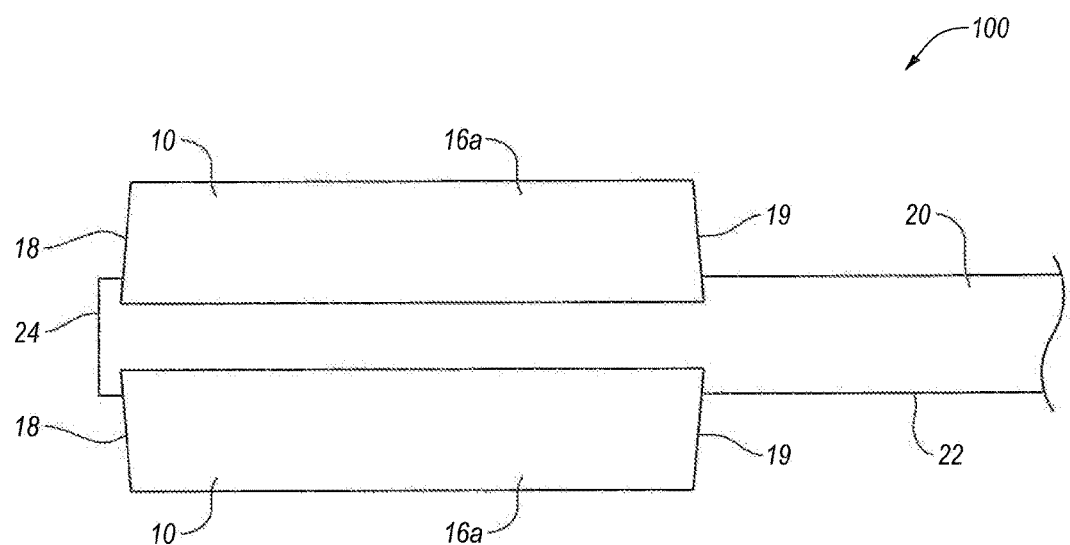
FIG. 2B illustrates a top view of the rod and adaptor illustrated in FIG. 2A.

Turning now to FIGS. 2A and 2B, an example sheet and rod connection system 100 is illustrated in connection with an example rod 20. In particular, the illustrated embodiment includes a set of two connectors 10 that are each connected to rod 20. More particularly, each of connectors 10 have interior surfaces 14 that are contoured and otherwise configured to couple to a corresponding portion of an exterior surface 22 of rod 20. Consequently, an adhesive may be placed on interior surface 14 and/or exterior surface 22 so as to secure connectors 10 to rod 20. The description of an adhesive is, however, merely exemplary, and other attachment mechanisms may be used. For instance, a clamp, bracket or other mechanical device may be placed fully or partially around connectors 10 and/or rod 20, to secure connectors 10 to rod 20. By way of example, one or more clamps may extend around both of connectors 10 as well as rod 20. Connectors 10 may be formed of a resilient material that compresses when the clamp is tightened, and thereby forms a compressive fit around rod 20.

Regardless of the manner of connection between connectors 10 and rod 20, and regardless of whether such connection is permanent or selective, connectors 10 may thus be secured to a desired location on rod 20. For instance, FIG. 2B illustrates an overhead view of a sheet and rod attachment system 100 in which two connectors 10 are coupled to external surface 22 of rod 20. In the illustrated embodiment, connectors 10 are shown as having a generally elongated shape, with a length that extends axially along rod 20 and is defined between distal end 18 and proximal end 19.

As further shown in FIG. 2B, connectors 10 may be positioned to be entirely interior to rod 20. That is to say, in the illustrated embodiment, distal ends 18 and proximal ends 19 of connectors 10 are each located proximally relative to distal end 24 of rod 20. This is, however, merely exemplary. In other embodiments, distal ends 18 of connectors 10 may be substantially aligned with distal end 24 of rod 20, or in still other embodiments, distal ends 18 of connectors 10 may be located distally relative to distal end 24 of rod 20. Further, while connectors 10 are illustrated as being axially aligned on rod 20, in some embodiments connectors 10 may be axially offset relative to each other. Moreover, while FIG. 2A illustrates connectors 10 being angularly offset around the circumference of rod 20 at approximately a one-hundred eighty degree interval, such spacing is also merely exemplary. In other embodiments, connectors 10 may angularly offset around the circumference of rod 20 at approximately a ninety degree interval, a one-hundred thirty five degree interval, or any other angular interval suitable for a desired application.

As described herein, the use of connectors 10 in connection with rod 20 may provide the ability to effectively couple a sheet material to connectors 10 and rod 20. This can provide, among other things, a composite reinforcement mechanism that makes use of different reinforcement materials to reinforce one or more structures, and which provides a connection between the different reinforcement materials. FIGS. 3A-3C further illustrate an example in which similar connectors couple to both rod and sheet materials.

More specifically, FIG. 3A illustrates sheet and rod attachment system 100 as used to connect a set of two connectors 10 to a rod 20 and a sheet 30a. In this example embodiment, connectors 10 are connected to rod 20 and each include an exterior surface 16a. Sheet 30a, which may be a fabric, mesh, or other material, may then be placed on exterior surfaces 16a and secured thereto using an adhesive, thermally bonded thereto, or connected in any other suitable manner.

Sheet 30a can be secured to all or a portion of connectors 10, and the size of sheet 30a may also be varied relative to the size of connectors 10 and/or rod 20. For instance, in FIG. 3A, sheet 30a is connected to only a portion of connectors 10. More particularly, a proximal end 32 of sheet 30a is located internal to connectors 10 and distally relative to the proximal end of connectors 10. In other embodiments, however, sheet 30a may be connected to, or cover, the entire axial length of connectors 10, and may be aligned with the proximal end of connectors 10, or may extend proximally relative to the proximal end of connectors 10.

Further, while the illustrated embodiment illustrates sheet 30a as extending radially such that its width is greater than the width of sheet and rod attachment system 10, this is also merely exemplary. In some embodiments, the width of connectors 10 or the width of sheet 30a may be such that substantially the entire width of sheet 30a is supported and/or connected to connectors 10.

Turning now to FIGS. 3B and 3C, an example embodiment that attaches multiple sheets 30a-30f to rod 20 is illustrated. For instance, FIG. 3B illustrates a rod 20 coupled to multiple layers 30a-30f of sheet material by using an adaptor. As shown, the sheet-to-rod adaptor includes two connectors 10 that are attached to opposing sides of rod 20, and are approximately one-hundred eighty degrees offset from each other. Once connectors 10 are positioned on or around rod 20, layers 30a-30f may then be placed on and/or secured to connectors 10 and/or rod 20.

In FIG. 3B, for example, a first layer 30c is positioned directly on first attachment surfaces 16a of connectors 10. First layer 30c is optionally made of a flexible material that allows layer 30c to generally contour to match the shape of connectors 10 and rod 20. In such an embodiment, such as that shown in FIG. 3B, first layer 30c may thus flex so as to maintain engagement along a substantial portion of first attachment surfaces 16a, and optionally even along a portion of rod 20. Moreover, inasmuch as first attachment surfaces 16a may have a shape that gradually changes, the amount of flexure or bending of first layer 30c may be reduced relative to the bending of the same material if wrapped directly around rod 20. As a result, the gradual changes in shape of layer 30c create little to no adverse effect on the strength of the sheet material.

As further illustrated in FIG. 3B, a second layer 30d may be placed on or against second attachment surfaces 16b of connectors 10. In a manner similar to first layer 30c, second layer 30d may then flex or otherwise generally conform to the combined shape of connectors 10 and rod 20, and be secured thereto. Furthermore, one or more additional layers may also be added, depending on the amount the sheet material is expected to be loaded. For instance, additional layers 30a, 30b are illustrated as being generally parallel to first layer 30c and along first attachment surfaces 16a. Similarly, additional layers 30e, 30f are generally parallel to second layer 30d and along second attachment surfaces 16b.

The actual number of layers of sheet material may be varied, as may the construction of layers 30a-30f. For example, while six layers 30a-30f are illustrated in FIGS. 3B and 3C, this is by way of illustration only, and more or fewer layers of sheet material in any particular embodiment are possible. For example, in some embodiments there may be only a single layer of sheet material, while in other embodiments there may be more than six layers of sheet material.

Furthermore, the manner in which layers 30a-30f are formed may be varied. For instance, each of layers 30a-30f may be a single, separate sheet that is separately connected to rod 20 through the use of connectors 10. In other embodiments, however, multiple layers may be formed from a single sheet of material. For instance, layers 30c, 30d may, in some embodiments, be a single sheet that is folded, such that a first portion extends over first attachment surfaces 16a, and a second folded surface extends over second attachments surfaces 16b. Similarly, layers 30b, 30e may be a single sheet of folded material, as may layers 30a, 30f. In still another embodiment, each of layers 30a-30f may be part of a single sheet that is folded multiple times around rod 20 and connectors 10, In still another example embodiment, upper layers 30a-30c may be made of a single sheet of material that is folded into three portions, and lower layers 30d-30f may be similarly constructed.

As will be appreciated by one skilled in the art in view of the disclosure herein, while FIGS. 3B and 3C illustrate the radially distal edges of layers 30a-30f as being separated, this is purely exemplary. Indeed, in the illustrated embodiments, the edges of layers 30a-30f are shown as being spaced apart generally to more easily identify the separate layers. Layers 30a-30f may, however, be placed directly on one another, such that little, if any, separation is visible between the multiple layers.

As further shown in FIGS. 3B and 3C, layers 30a-30f may flex so as to collectively define a narrower profile at the radially distal edges than at the center of rod 20. Such a design may be facilitated by the shape of connectors 10, in which first and second attachment layers 16a, 16b connect and form a wedge-shaped connector. Such profile may itself exist largely only at a position adjacent connectors 10 as illustrated in FIG. 3C. More particularly, as layers 30a-30f of the sheet material extend axially away from an interior end of rod 20, layers 30a-30f may generally draw closer together such that the distance between the outermost layers 30a, 30f is reduced relative to the same distance on rod 20. In other words, the shape of layers 30a-30f may taper so as to form a narrower profile as distance from rod 20 and/or connectors 10 increases. As rod 20 acts as a spacer between layers 30a and 30f, the taper may occur as a result of no spacer material being present and/or the introduction of tension which tends to draw layers 30a-30f together.

Figure 4:
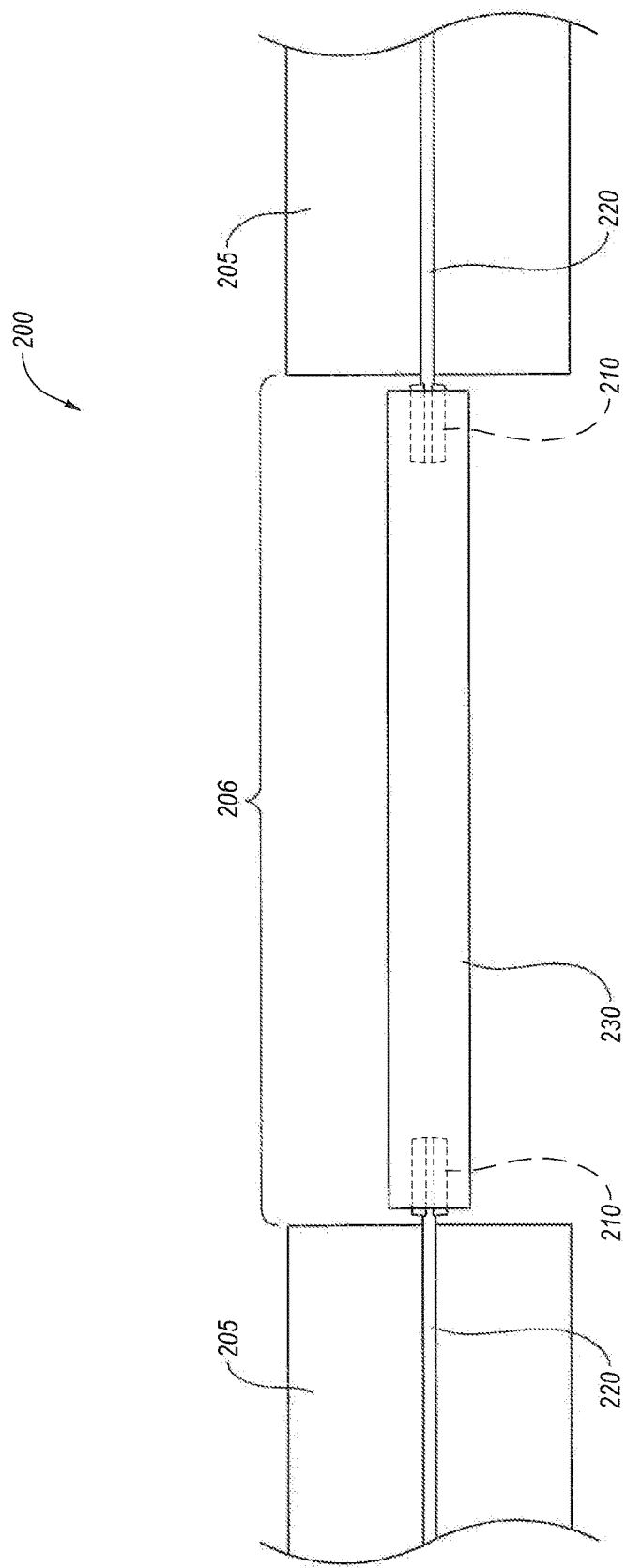
FIG. 4 schematically illustrates an example reinforcement system in which a set of adaptors are used to couple a sheet material to each of two rods.

Turning now to FIG. 4, a sheet and rod reinforcement system 200 is schematically illustrated, and includes multiple rods 220 that connect to a single sheet 230. In the illustrated embodiment, rods 220 are used in reinforcing suitable static structures 205, while sheet 230 is illustrated as providing reinforcement over a span 206. Span 206 is generally representative of any suitable structure or space that may be reinforced with sheet 230. For instance, a beam, column, girder, or any other suitable structure may exist within span 206, and sheet 230 may be placed on and/or around such a structure to reinforce, repair or strengthen the structure. In other cases, however, span 260 may merely be a gap between structures 205. For instance, a roof of a building may be supported in which structures 205 are trusses or girders. Sheet 230 may provide reinforcement over a gap between the trusses or girders to support a ceiling or roof therebetween, and in some cases sheet 230 may merely anchor connect rods 220 to each other, without reinforcing a structure separate from static structures 205.

With continued reference to FIG. 4, the example reinforcement system 200 includes rods 220 attached to static structures 205 and protruding therefrom. Adaptors 210 may be placed at the protruding ends of rods 220. Adaptors 210 are configured to connect to rods 220, and also to connect to sheet 230, thereby attaching sheet 230 to rods 220. Adaptors 210 are generally representative of any adaptors and connectors as described herein for attaching a rod to a sheet. Accordingly, adaptors 210 may be a single connector, may be a pair of opposed connectors, or may otherwise be a connector as described herein, although other types of adaptors may also be utilized.

Thus, while two connectors have previously been described as being collectively used as a sheet-to-rod adaptor, this is merely exemplary. In other embodiments, for instance, a single connector may be coupled to a rod and act as a sheet-to-rod connector. In such a case, a sheet material may be placed along an upper attachment surface and then wrap around only a portion of the rod, and then extend along a lower attachment surface of the connector. This too is merely exemplary, however, and connectors as described herein may be used in a wide variety of different manners to couple a sheet material to a rod.

It should also be appreciated in view of the disclosure herein that sheet and rod reinforcement system 200 as illustrated is solely exemplary and not limiting of the manner or nature in which sheet 230 and/or rods 220 may be used. For example, while two rods 220 are shown as being connected to a single sheet 230, it is not necessary to have multiple rods connected to sheet 230, nor is it necessary that there only be a single sheet 230. For instance, a single rod 220 may instead be coupled to multiple sheets 230. Moreover, while adaptors 210 are illustrated as being connected to protruding portions of rods 210, in other embodiments rods 220 may not extend from structures 205 or adaptors 210 may be secured at other portions of rods 220. Rods 220 may thus be attached to structures 205 in any suitable manner, including through the use of near-surface mount techniques, through the use of anchoring devices, or in any other suitable manner.

Furthermore, while embodiments described herein generally relate to the use of symmetric connectors and/or adaptors that allow layers of sheet material to be placed on two opposing surfaces thereof, it should be appreciated that these embodiments are exemplary only, and that it is not necessary that a connector or adaptor as described herein by symmetric, or that sheet material be placed on two or more sides of the connector. For example, in one embodiment, a wedge shape may be formed that has an upper surface having one profile and angle, while a lower surface has a different angle or profile. Such a different profile and/or angle of the lower surface may not be configured to act as an attachment surface, such that one or more layers of the sheet material may be attached to the connector only along the upper surface. Of course, a wide variety of different options in the shape and configuration of connectors is possible. For instance, in some embodiments, upper and lower surfaces—whether they are configured for attachment to sheet materials or not—may not intersect, and one or more intermediate surfaces may be placed between the upper and lower surfaces.

To further illustrate the ability of the connectors and adaptors described herein to be varied; reference will now be made to FIGS. 5A-5I. Illustrated in such figures are a variety of different connectors, and such connectors may be symmetric or non-symmetric. Additionally, connectors and adaptors may also have a variety of different shapes, surface profiles, and dimensions. Furthermore, while FIGS. 5A-5I each illustrate a single connector that can be coupled to a rod, such single connectors are illustrated primarily to simplify the discussion, and it will be appreciated that multiple connectors may be used around a single rod. Indeed, any prior discussion herein related to a connector or adaptor may be equally applied to any of the connectors described and illustrated in FIGS. 5A-5I.

In FIG. 5A, for example, a connector 310 is illustrated that is generally wedge-shaped, and has an interior surface 314 configured to attach to a rod 20, as well as attachment surfaces 316 that can attach to a sheet. In this illustrated example, attachment surfaces 316 taper towards-each other to form a wedge-shape, and further are curved. In this particular embodiment, the curvature of attachment surfaces 316 is generally convex as such surfaces curve outward relative to the interior of connector 310.

It is, however, not necessary that an entire attachment surface have a single or constant shape. For example, FIG. 5B illustrates another connector 410 that includes an interior surface 414 configured to match an exterior profile of rod 20. In this particular embodiment, the attachment surfaces 416 that are configured to be connected to a sheet have different profiles. For instance, a radially distal portion may have a concave shape while a radially proximal portion has a convex shape. In this case, an inflection point 417 is approximately in the middle of attachment surface and represents a location where the shape of attachment surface 416 transitions from convex to concave; however, the actual location of inflection point may be varied. Moreover, inflection point 417 may generally represent a location where any type of a transition occurs, such as a transition from one convex curve to another convex curve, from a concave curve to another concave curve, or from any type of curve to a generally linear profile.

While various connectors described herein are generally wedge-shaped, this too is merely exemplary. For example, FIG. 5C illustrates a connector 510 that is not necessarily wedge-shaped, but instead combines two wedge-shapes into a single component that has a generally eye-shaped appearance. In particular, the illustrated connector 510 includes an interior surface 514 that is, in this embodiment, wholly interior to the body of connector 510. Thus, in contrast to some other connectors described herein, interior surface 514 may be contoured to match a shape of substantially an entire external profile of a rod, rather than merely a portion thereof. In other embodiments, connector 510 may include a second interior surface in addition to interior surface 514 that is also wholly interior to the body of connector 510. The shape of attachment surfaces 516 may be varied as desired. For example, while the illustrated embodiment illustrates attachment surfaces as being generally concave at portions radially extended from the center of the hole forming interior surface 514, and changing to convex surfaces at inflection points 517, this is merely exemplary and other surface profiles, contours, and the like may be utilized.

The width of a connector and/or the amount of engagement such a connector has with a rod may also be varied. For example, a connector such as connector 310 may have an interior surface 314 that engages approximately one-hundred twenty degrees of rod 20, and/or may have a width that is about equal to the diameter of rod 20. In other embodiments, the width of connector 310 is less than the diameter of rod 20 (e.g., seventy-five percent of the diameter of rod 20). As shown in FIG. 5D, however, the amount of engagement and/or the width of the connector may also be varied. For instance, in FIG. 5D, connector 610 may have an interior surface 614 that is configured to engage less than one-hundred twenty degrees of rod 20. The illustrated example, for instance, may engage around about ninety degrees of rod 20, although it may be more (e.g., up to three-hundred sixty degrees) or less (e.g., about seventy-five degrees), as desired. As compared to an adaptor configured to engage a rod of the same size, a reduction in the amount of engagement may also include a reduction in the relative height of the connector.

As further shown in FIG. 5D, the width of attachment surface 616 may also be varied. In particular, the illustrated attachment surface 616 has a width that is approximately one-hundred five percent the diameter of rod 20, although such length may be more (e.g., twice the diameter of rod 20) or less, as described herein. For example, connector 714 in FIG. 5E also engages a rod 20 along an interior surface 714, but has a width less than the diameter of rod 20. For instance, the width of attachment surfaces 716 may be about half the diameter of rod 20, although even lesser widths (e.g., about thirty-percent) may be used.

FIG. 5E further illustrates that a connector 710 may be configured to connect to a couple to an even greater portion of rod 20. For instance, the height of connector 710, and the shape of surface 714, is such that connector 710 may engage rod 20 around approximately one-hundred eighty degrees of the outer surface of rod 20. In an embodiment where a connector engages around substantially half the outer surface of rod 20, two connectors may then be combined such that one or more layers of sheet material may be connected to the rod without direct engagement of the rod, although direct engagement between the rod and sheet materials may also be avoided in other embodiments as well.

FIG. 5F illustrates still another embodiment of a connector 810 according to other embodiments of the invention. As noted previously, an attachment surface may have any number of different shapes and/or configurations. Connector 810 has an attachment surface 816 illustrative of such variation. For example, in the illustrate embodiment, attachment surface 816 has an alternating set of concave portions 817a, 817c, 817e and convex portions 81b, 817d, 817f. By alternating between concave and convex portions, the surface area of attachment surface 816 may be increased, thereby allowing greater bonding between a sheet and attachment surface 816. Moreover, the concave and convex portions 817a-f may run the entire axial length of connector 810, but this is not necessary. For instance, in some embodiments, concave portions 817a, 817c, 817e may be grooves or dimples that are only along a portion of the axial length of connector 810.

While rod 20 has been described and illustrated herein as having a generally circular cross-sectional shape, and such that various sheet-to-rod connectors and adaptors are contoured to receive all or a portion of the outer surface of the cylindrical rod 20, the shape of a rod may be varied in any suitable manner, along with the corresponding shape of the sheet-to-rod connector and/or adaptor. Exemplary embodiments are thus illustrated in FIGS. 5G-5I in which a rod does not necessarily have a circular cross-section. For instance, in FIG. 5G, a rod 920 has a diamond shape and is configured to engage against an interior surface 914 of connector 910. In this case, interior surface 914 includes two generally linear portions receive a corner of the outer surface of rod 920. For instance, the two generally linear portions may be generally perpendicular to correspond to the illustrated rod 920. In another example, a rod 1020 may have an elliptical or oval cross-sectional shape. In such an embodiment, a sheet-to-rod connector 1010 may thus also have an interior surface 1014 that is shaped, contoured, or otherwise configured to receive the outer surface of the oval rod 1020.

A rod may also be square, rectangular, or some other cross-sectional shape. For instance, FIG. 5I illustrates a square rod 1120 that is used in connection with sheet-to-rod connector 1110. In FIG. 5I, rod 1120 is oriented such that two corners are received by connector 1110. To facilitate such connection, connector 1110 may include a plurality of interior connection surfaces. For instance, a first interior connection surface 1114 may be formed to receive a full edge surface of square rod 1120. Two second interior connection surfaces 1115 may be about perpendicular to first interior connection surface 1114 so as to match the corners of square rod 1120. Second interior connection surfaces 1115 may thus engage all or a portion of second and third edge surfaces of square rod 1120.

As also shown in FIG. 5I, connector 1110 may include an attachment surface 1116 that receives a sheet material and is attached thereto. In this example embodiment, attachment surface 1116 has a generally linear edge, such that attachment surface 1116 may be generally planar. Further, in the illustrated embodiment, connector 1110 has a height that exceeds the height of rod 1120. As a result, a lip 1119 is formed above and below rod 1120.

Figure 5J:
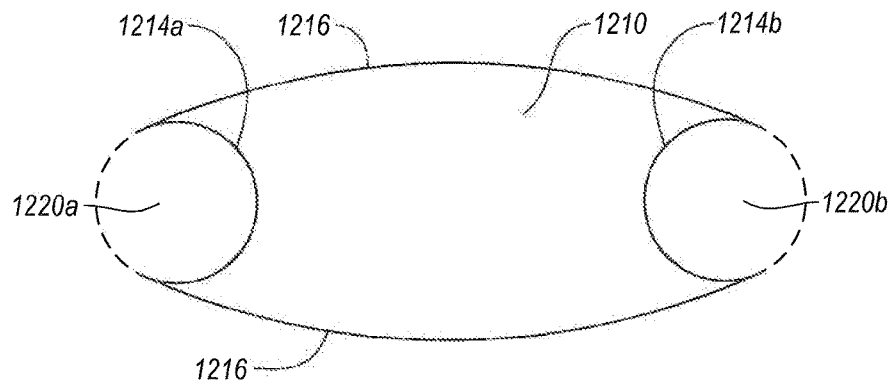
FIG. 5J illustrates a frontal view of an example connector that operates as an adaptor to couple a plurality of rods to sheet materials.
Figure 5K:
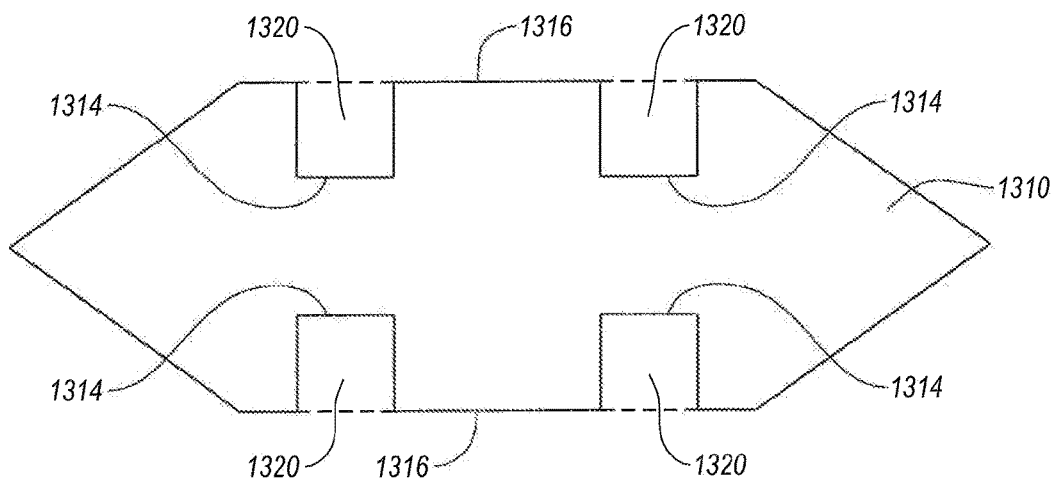
FIG. 5K illustrates a frontal view of an example connector that operates as an adaptor to couple a plurality of rods to sheet materials.
Figure 5L:
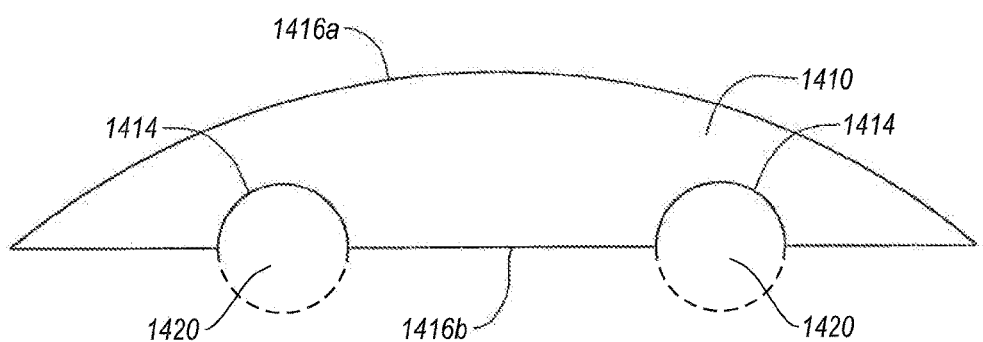
FIG. 5L illustrates a frontal view of an example connector that operates as an adaptor to couple a plurality of rods to sheet materials.

FIGS. 5J-5L further illustrate the ability of the connectors and adaptors described herein to be varied. Illustrated in such figures are a variety of connectors that can be coupled to a plurality of rods. While FIGS. 5J-5L each illustrate a single connector, such single connectors are illustrated primarily to simplify the discussion, and it will be appreciated that multiple connectors may be used. Indeed, any prior discussion herein related to a connector or adaptor may be equally applied to any of the connectors described and illustrated in FIGS. 5J-5L.

In FIG. 5J, for example, a connector 1210 is illustrated that can attach to two rods. Connector 1210 can include attachment surfaces 1216 creating a generally oval-shaped periphery of connector 1210. In this particular embodiment, attachment surfaces 1216 can extend between a first interior surface 1214a located at a first end of connector 1210 and a second interior surface 1214b located at a second end of connector 1210. The curvature of attachment surfaces 1216 is generally convex and can allow sheet materials to flex or otherwise generally conform to connector 1210 and be secured thereto. As shown in FIG. 5J, first interior surface 1214a can be configured to attach to a first rod 1220a and second interior surface 1214b can be configured to attach a second rod 1220b. Although first rod 1220a and second rod 1220b are illustrated as identical rods, first interior surface 1214a and second interior surface 1214b can be configured to attach rods having distinct sizes and shapes.

FIG. 5K illustrates still another embodiment of a connector 1310 according to other embodiments of the invention. In this particular embodiment, connector 1310 has an elongated hexagonal-shape and includes four interior surfaces 1314 that can attach to four rods 1320, as well as attachment surfaces 1316 that can attach to sheet materials. Two upper interior surfaces 1314 are illustrated formed within upper attachment surface 1316 and two lower interior surfaces 1314 are illustrated formed within lower attachment surface 1316. While four interior surfaces 1314 are shown, any number of interior surfaces 1314 is possible. For example, connector 1310 may include three upper interior surfaces 1314 and three lower interior surfaces 1314 or one upper interior surface 1314 and two lower interior surfaces 1314. In this particular embodiment, attachment surfaces 1316 are illustrated as upper and lower linear edges that parallel each other through an intermediate portion of connector 1310 and converge at points located at both ends of connector 1310. In this case, attachment surfaces 1316 of connector 1310 can provide an increased strength to a connection between connector 1310 and sheet materials by increasing the surface area for attachment of sheet materials to connector 1310.

As shown in FIG. 5K, square rods 1320 can be used in connection with connector 1310. Similar to the interior connection surfaces of FIG. 5I, each interior surface 1314 may include interior connection surfaces. For instance, a first interior connection surface may be formed to receive a first full edge of square rods 1320. Two second interior connection surfaces may be about perpendicular to first interior connection surface so as to match the corners of square rods 1320. Second interior connection surfaces may thus engage all or a portion of second and third edges of square rods 1320. In this particular embodiment, interior surfaces 1314 are substantially interior to the body of connector 1310. Thus, fourth edges of rods 1320 can be interior to or substantially aligned with attachment surfaces 1316. While square rods 1320 are illustrated, interior surfaces 1314 may be formed to receive rods that are circular, rectangular, triangular, or some other cross-sectional shape. Accordingly, attachment surfaces 1316 can be attached to sheet materials or attachment surfaces 1316 can be placed to press directly against a contact surface of a static structure without interference from the rods 1320.

FIG. 5L illustrates still another embodiment of a connector 1410 according to other embodiments of the invention. Connectors and adapters described herein can include two, three, four, or any other number of surfaces to attach material sheets thereon. In this particular embodiment, connector 1410 may have one attachment surface. In particular, a lower exterior surface 1416b is generally planar and includes interior surfaces 1414 formed therein. Interior surfaces 1414 may be sized and shaped to engage at least a portion of rods 1420. Although two interior surfaces 1414 are shown, any number of interior surfaces may be formed in lower exterior surface 1416b. For example, lower exterior surface 1416b may have three, four, or five interior surfaces formed therein. While interior surfaces 1414 are illustrated having a similar size and shape, interior surfaces 1414 may be sized and shaped to engage rods of different sizes or rods having different cross-sectional shapes. As shown in FIG. 5L, an upper exterior surface 1416a is opposite lower exterior surface 1416b and intersects lower exterior surface 1416b at both ends of connector 1410. Upper exterior surface 1416a is generally convex and configured to attach to sheet materials. Accordingly, upper exterior surface 1416a may provide a surface configured to attach sheet materials on connector 1410, while lower exterior surface 1416b may not.

Figure 6:
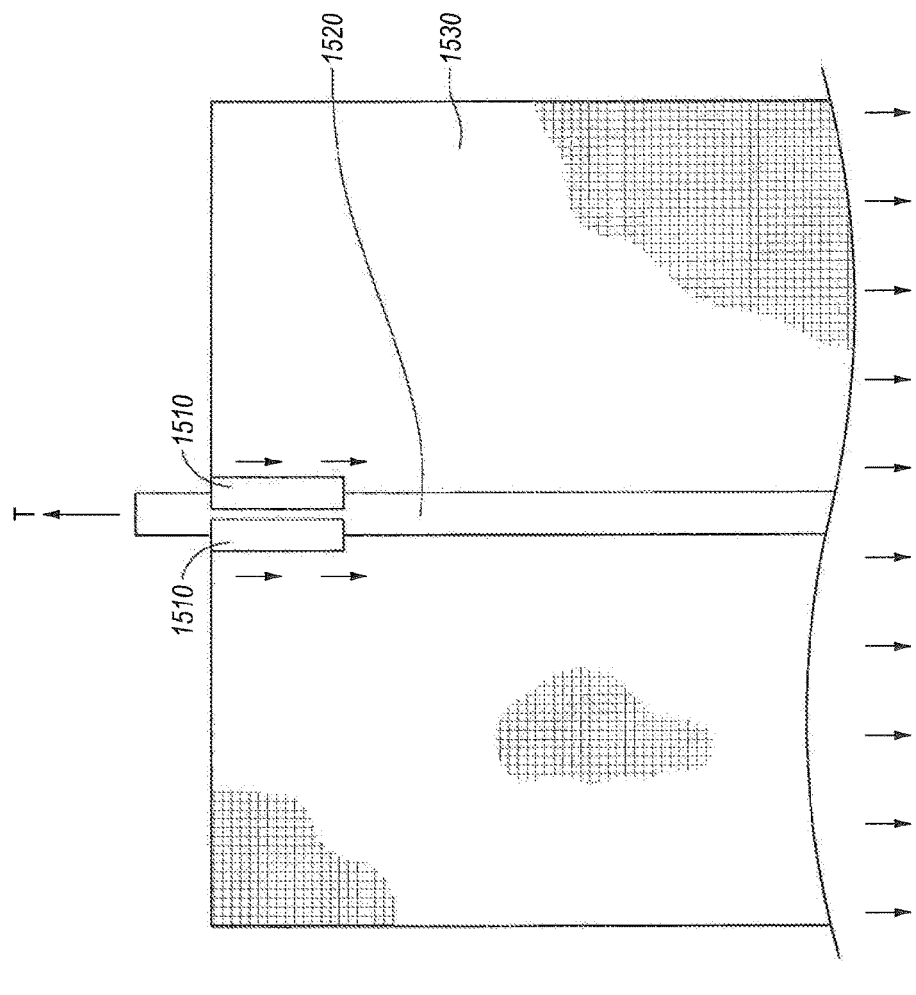
FIG. 6 schematically illustrates an example post-tensioning reinforcement system.

As discussed previously, reinforcement systems described herein can be used in any number of ways including to reinforce, rehabilitate, and/or repair new and existing beams, columns, plates and other structures. FIG. 6 illustrates one example of a post-tensioning reinforcement system 1500. The post-tensioning reinforcement system 1500 can include a sheet 1530 and a rod 1520 extending along the length of sheet 1530. In the illustrated embodiment, rod 1520 is illustrated as a FRP rod and sheet 1530 is illustrated as a bi-directional FRP sheet, however, rod 1520 and sheet 1530 may be made from any number of materials including, but not limited to, SRPs, and/or metals, polymers, organics and composite materials. Both rod 1520 and sheet 1530 are attached to a static structure (not shown) in any suitable manner, including through the use of anchoring devices, the use of near-surface mount techniques, or in any other suitable manner. In the illustrated embodiment, rod 1520 may be elongated elastically by applying a predetermined tensioning force T to rod 1520 with a hydraulic jack, a tensioning anchor, or other suitable means. With rod 1520 tensioned and elongated, adaptors 1510 can then attach sheet 1530 to rod 1520. Adaptors 1510 can be configured to connect to rod 1520, and also to connect to sheet 1530, thereby attaching sheet 1530 to rod 1520. While adaptors 1510 are shown attaching sheet 1530 to rod 1520 near a free end portion of rod 1520, adaptors can attach sheet 1530 to rod 1520 at a middle portion of rod 1520, at a portion of rod 1520 near a surface of the static structure, or at any other suitable location on rod 1520. Adaptors 1510 may be connected to rod 1520 and sheet 1530 by using an adhesive, clamp, bracket, thermal bond, or other suitable mechanism. Adaptors are generally representative of any adaptors and connectors as described herein for attaching a rod to a sheet. Accordingly, adaptors 1510 may be a single connector, may be a pair of opposed connectors, may be two pairs of opposed connectors, or may otherwise be a connector as described herein, although other types of adaptors may also be utilized. With sheet 1530 attached to rod 1520 by adaptors 1510, the tensioning force T on rod 1520 can be released. Releasing the tensioning force on rod 1520 may cause rod 1520 to retract slightly and pull sheet 1530 into the static structure thereby compressing the static structure. Under certain conditions such as where the static structure is a concrete slab, compressive forces on the static structure can help minimize deflection and cracking of the static structure. Accordingly, post-tensioning reinforcement system 1500 can provide additional strength to static structures by causing compressive forces to act on the static structures. In addition, post-tensioning reinforcement system 1500 can help prevent sheet materials from pulling away from static structures by pulling sheet materials toward the static structures.

In other embodiments, adaptors 1510 can attach sheet 1530 to rod 1520 before tensioning rod 1520. For example, adaptors 1510 can attach sheet 1530 to rod 1520. A tensioning force T can then be applied to rod 1520 to elastically elongate rod 1520. After rod 1520 is tensioned, an anchor can be attached to rod 1520 adjacent the static structure. The tensioning force T can then be released from rod 1520. The anchor can then keep rod 1520 in a permanently stressed elongated state causing a compressive force to act on the static structure. In other embodiments, sheet 1530 can be tensioned rather than the rod 1520.

The foregoing detailed description describes the invention with reference to specific exemplary embodiments. However, it will be appreciated that various modifications and changes can be made without departing from the scope of the present invention as set forth in the appended claims. For example, various connectors and/or adaptors are described having different combinations of sizes, shapes, configurations, and the like. Such differences are provided primarily to illustrate the wide number of different manners in which adaptors and connectors can be used, made, and modified within the scope of the present invention. Different features have also been combined in some embodiments to reduce the illustrations required, and are not intended to indicate that certain features are only compatible with other features. Thus, unless a feature is expressly indicated to be used only in connection with one or more other features, such features can be used interchangeably on any embodiment disclosed herein or modified in accordance with the scope of the present invention. The detailed description and accompanying drawings are thus to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description, which examples are to be construed as non-exclusive. Moreover, any steps recited in any method or process claims may be executed in any order and are not limited to the order presented in the claims, unless otherwise stated in the claims. Accordingly, the scope of the invention should be determined solely by the appended claims and their legal equivalents, rather than by the descriptions and examples given above.

What is claimed is:

1. A sheet and rod attachment system, comprising:
   a rod having an exterior surface, a proximal end, and a distal end;
   at least one sheet adaptor on said rod, wherein said at least one sheet adaptor includes:
   proximal and distal ends, the distal end of the at least one sheet adaptor being disposed at the distal end of the rod;
   a length extending axially along the rod and defined between the proximal and distal ends of the at least one sheet adaptor, the at least one sheet adaptor extending along a portion of the rod towards the proximal end of the rod;
   a rod engagement surface engaging said exterior surface of said rod, wherein said rod engagement surface is contoured to match a shape of the exterior surface of the rod, wherein said rod engagement surface is sized to engage said exterior surface of said rod and mate with less than half a cross-sectional shape of said rod;
a first attachment surface; and
a second attachment surface generally opposed said first attachment surface and intersecting said first attachment surface; and
an attachment mechanism that is adapted to connect the at least one sheet adaptor to the rod, the attachment mechanism being distinct from the rod and the at least one sheet adaptor.

2. The sheet and rod attachment system recited in claim 1, wherein said rod is made of fibre-reinforced polymer (FRP).

3. The sheet and rod attachment system recited in claim 1, wherein said at least one sheet adaptor is discretely formed relative to said rod, and wherein said at least one sheet adaptor is affixed to said rod.

4. The sheet and rod attachment system recited in claim 3, wherein said attachment mechanism is an adhesive.

5. The sheet and rod attachment system recited in claim 1, wherein said at least one sheet adaptor on said rod includes two sheet connectors, said two sheet connectors being substantially identical and engaged on said rod at about a one-hundred eighty degree angular spacing.

6. The sheet and rod attachment system recited in claim 1, further comprising:
a flexible sheet secured to at least said first attachment surface, said sheet extending axially relative to said rod.

7. The sheet and rod attachment system recited in claim 1, wherein said flexible sheet, said rod, and said at least one sheet adaptor comprise at least a portion of a post-tensioning reinforcement system.

8. The sheet and rod attachment system recited in claim 1, further comprising:
a first flexible sheet layer, said first flexible sheet layer being secured to said first attachment surface; and
a second flexible sheet layer separate and distinct from the first flexible sheet layer, said second flexible sheet layer being secured to said second attachment surface.

9. The sheet and rod attachment system recited in claim 8, wherein distal ends of the at least one connector and the rod are disposed between proximal and distal ends of the first and second flexible sheets.

10. The sheet and rod attachment system as recited in claim 8, wherein the proximal ends of the at least one connector and the rod are disposed proximal to proximal ends of the first and second flexible sheets, such that the proximal ends of the pair of connectors are not disposed between the first and second flexible sheets.

11. The sheet and rod attachment system recited in claim 1, further comprising:
a plurality flexible sheet layers on each of said first and said second attachment surfaces.

12. The sheet and rod attachment system recited in claim 1, wherein the engagement between the at least one sheet adaptor and the exterior surface of the rod extends over an interval of at least seventy-five degrees of the exterior surface of the rod.

13. The sheet and rod attachment system recited in claim 1, wherein the engagement between the at least one sheet adaptor and the exterior surface of the rod extends over an interval of between seventy-five degrees and one-hundred eighty degrees of the exterior surface of the rod.

14. A sheet and rod attachment system comprising:
a rod having an outer surface;
a pair of connectors attached to said outer surface on opposing sides of said rod, each connector including:
a rod engagement surface engaging said exterior surface of said rod, wherein said rod engagement surface is contoured to match a shape of the outer surface of the rod, wherein said rod engagement surface is sized to correspond to the shape of said exterior surface of said rod;
a first exterior surface; and
a second exterior surface generally opposed said first exterior surface;
a first flexible sheet attached to said first exterior surface of each connector and said rod;
a second flexible sheet attached to said second exterior surface of each connector, said rod, and said first flexible sheet, wherein the first flexible sheet and the second flexible sheet are attached to one another in a planar configuration; and
an attachment mechanism that is adapted to connect the pair of connectors to the rod, the attachment mechanism being distinct from the rod and the pair of connectors.

15. The sheet and rod attachment system recited in claim 14, wherein the engagement between one of the connectors and the exterior surface of the rod extends over an interval of at least seventy-five degrees of the exterior surface of the rod.

16. The sheet and rod attachment system recited in claim 14, wherein the engagement between one of the connectors and the exterior surface of the rod extends over an interval of between seventy-five degrees and one-hundred eighty degrees of the exterior surface of the rod.

17. The sheet and rod attachment system recited in claim 14, wherein distal ends of the pair of connectors and the rod are disposed between proximal and distal ends of the first and second flexible sheets.

18. The sheet and rod attachment system as recited in claim 14, wherein proximal ends of the pair of connectors and the rod are disposed proximal to proximal ends of the first and second flexible sheets, such that the proximal ends of the pair of connectors are not disposed between the first and second flexible sheets.

* * * * *